H. MAGRON.
PROCESS OF COOLING ELECTRIC FURNACES BY AIR.
APPLICATION FILED FEB. 9, 1915.

1,131,609.

Patented Mar. 9, 1915.

UNITED STATES PATENT OFFICE.

HENRI MAGRON, OF FOS, HAUTE-GARONNE, FRANCE.

PROCESS OF COOLING ELECTRIC FURNACES BY AIR.

1,131,609. Specification of Letters Patent. Patented Mar. 9, 1915.

Application filed February 9, 1915. Serial No. 6,991.

*To all whom it may concern:*

Be it known that I, HENRI MAGRON, engineer, of Fos, Haute-Garonne, France, have invented a new and useful Process of Cooling Electric Furnaces by Air, which process is fully set forth in the following specification.

The present invention relates to a process for effectively cooling, by means of cold air or other gas, electric furnaces more especially designed for treating refractory materials requiring an elevated temperature in the interior of the furnace.

The method of cooling employed avoids all the inconveniences resulting from the use of water whose presence in the immediate vicinity of a mass carried to a high temperature is always dangerous whatever precautions may be taken in its use.

The air utilized for cooling can be employed in several different ways, for example, either by simple circulation at low pressure of a sufficient volume of air, the cooling being effected by simple absorption of the heat in the mass of air, or by circulation of air at high pressure and utilizing there the cooling due to expansion, or by combination of the two means, or by air cooled artificially. The circulation of air may be made around the furnace vertically from top to bottom or from bottom to top, or horizontally or in any other way.

The cooling of the exterior of the furnace permits suppressing the refractory linings, frequently employed in electric furnaces, provided there is used the known process which consists in utilizing the material to be treated or the material treated as a lining, and the location of the casing of the furnace is determined in accordance with which of the two methods is employed. If the material to be treated is used as the lining, the air space may be sufficiently restricted so that the material may be fused even up to the walls of the furnace and all along the length of the cooled wall; on the contrary, if the material treated is used as the lining, the air space must be sufficiently large in order that there shall exist between the fused mass and the caked or already treated portion, a space sufficient in order that the material not transformed shall form a lining. It is always to be noted that in this case the cooling permits reduction of thickness of the material not treated to a limit relatively very narrow.

In the annexed drawings is shown, by way of example, a furnace for circulating air lengthwise from top to bottom located in a fixed casing of masonry.

Figure 1:
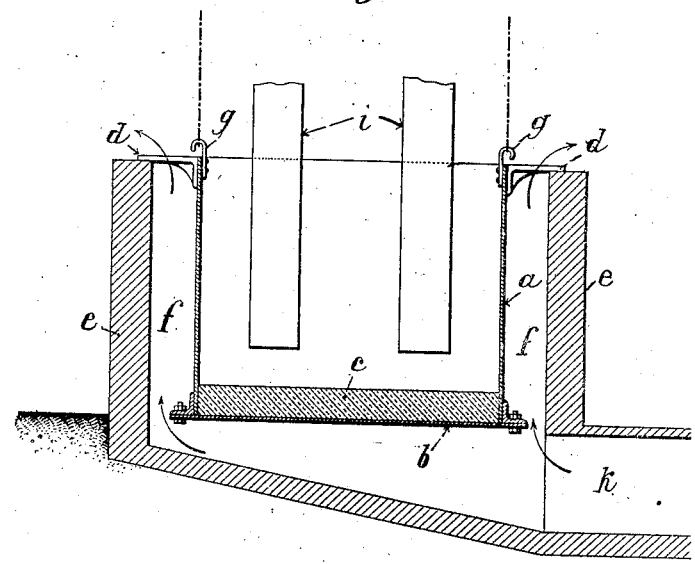
Figure 2:
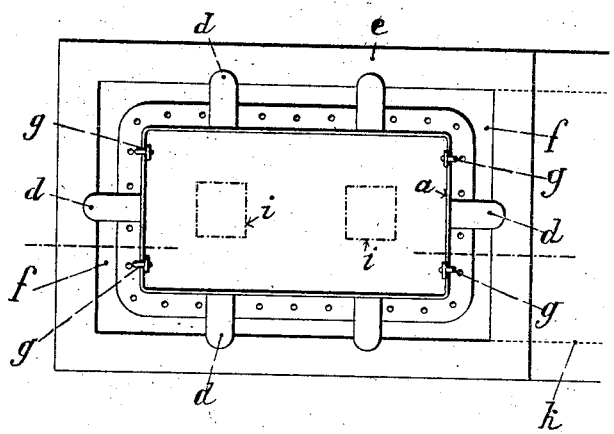

Figure 1 is a vertical sectional view showing the furnace, and Fig. 2 is a plan view of the same.

This furnace consists simply of a vat *a* of cylindrical, truncated or other shape made of sheet iron or other heat conducting material, whose removable bottom *b* is secured to the walls either by bolts or by hooks or other means. On the bottom reposes a refractory lining *c* of convenient material such as silica, alumina magnesia, carbon or the like, according to the operations to be carried out in the furnace.

In carrying out my method of cooling, air under high pressure is conducted through supply conduit *k* to the annular space *f* surrounding the furnace and is discharged into the atmosphere around the upper portion of the furnace. As the air enters the annular cooling space *f*, it is allowed to expand and further expansion takes place where the air discharges at the top of the furnace. The air in expanding from a high pressure to a much lower pressure while passing in contact with the walls of the furnace very effectively takes up heat from the outer portions of the charge in the furnace and maintains a cool zone of temperature inside and next the walls of the furnace where the ore remains unaffected by the intense heat of the bath and forms a protecting lining for the walls of the receptacle.

The furnace is suspended at its upper extremity, by aid of suitable supports *d*, from a fixed or movable casing *e* of any material, leaving between the two walls an annular space *f* for the circulation of air. The furnace may be made with double walls between which the cooling air may be circulated. The discharge of the resulting product is effected very readily by elevating the furnace out of the casing and disconnecting the removable bottom.

This furnace is capable of working with a continuous or an alternating current of any phase and with any number or any arrangement of electrodes *i*. The form of its base lends itself to any combinations desirable.

The walls of the furnace *a* are provided at their upper part with four hooks *g* for elevating it. The air is brought in at the lower part by a conduit *h* which delivers into the annular space *f*.

As has been stated above, the furnace described is by way of example, and it is to be understood that the method of cooling by air, which is the object of this invention, is applicable to all kinds of electric furnaces, including furnaces with electrodes, resistance furnaces and induction furnaces.

I claim—

1. A method of cooling an electric furnace for smelting ores consisting in circulating air in heat interchanging relation with the walls of the furnace while expanding the air for the purpose of cooling the outer portions of the charge below its melting point.

2. A method of cooling an electric furnace for smelting ores consisting in circulating previously cooled air in heat interchanging relation with the walls of the furnace while expanding the air for the purpose of cooling the outer portion of the charge below its melting point.

In testimony whereof I have signed this specification in the presence of two subscribing witnesses.

HENRI MAGRON.

Witnesses:
I. EARLY LAY,
GABRIEL BELLIARD.